United States Patent [19]

Sasae et al.

[11] Patent Number: 5,609,558

[45] Date of Patent: Mar. 11, 1997

[54] WASTE-TREATING MATERIAL

[75] Inventors: Taiichiro Sasae; Tomio Nishida, both of Kyoto; Masakazu Uekita; Takashi Funahashi, both of Kobe, all of Japan

[73] Assignees: Kanegafuchi Kagaku Kogyo Kabushiki Kaisha, Osaka; En-Tech Research Institute, Inc., Kyoto, both of Japan

[21] Appl. No.: 35,577

[22] Filed: Mar. 23, 1993

[30] Foreign Application Priority Data

Dec. 16, 1992 [JP] Japan .................................. 4-355104

[51] Int. Cl.$^6$ .............................. B09B 3/00; B09B 5/00
[52] U.S. Cl. ............................................ 588/257; 588/252
[58] Field of Search ........................... 405/128, 129, 405/258, 263; 588/249, 252, 256, 257, 901; 75/961

[56] References Cited

U.S. PATENT DOCUMENTS

| | | | |
|---|---|---|---|
| 4,116,705 | 9/1978 | Chappell | 588/257 |
| 4,340,510 | 7/1982 | Howanietz et al. | 524/5 |
| 4,377,416 | 3/1983 | Maul et al. | 106/718 |
| 4,518,508 | 5/1985 | Conner | 588/257 |
| 4,935,034 | 6/1990 | Alexander | 52/415 |
| 5,043,103 | 8/1991 | Manchak et al. | 405/129 X |

FOREIGN PATENT DOCUMENTS 3942827  4/1991  Germany.

OTHER PUBLICATIONS

Database WPI, Nippon Jiryoku Senk, JP-A-56 044 085, Apr. 23, 1981.
Chemical Abstracts, vol. 110, No. 2, p. 274.
Database WPI, Nippon Kokan KK, JP-A-57 180 494, Apr. 28, 1981.
Patent Abstracts of Japan, vol. 11, No. 69 and JP-A-61 227 899 (I. Toshihiro et al, 9 Oct. 1986).

*Primary Examiner*—John A. Ricci
*Attorney, Agent, or Firm*—Armstrong, Westerman, Hattori, McLeland & Naughton

[57] ABSTRACT

A waste-treating material which comprises cement and at least one reducing metal, effective for stabilizing industrial wastes containing harmful metals like a heavy metal and the like and cyanides. A preferred example of the reducing metal is iron. Additionally the waste-treating material may also contain at least one member selected from a group consisting of a reducing agent, aluminum sulfate, allophane, and bentonite as the auxiliary. The use of this waste-treating material makes it possible to stabilize the hazardous heavy material and the cyanides contained in the industrial wastes, thereby remarkably contributing to a stabilizing treatment of the industrial wastes.

9 Claims, No Drawings

WASTE-TREATING MATERIAL

BACKGROUND OF THE INVENTION

1. Field of the Invention

The present invention relates to a waste-treating material, and more particularly to a material used for safely disposing of industrial wastes containing hazardous heavy metals and cyanides.

2. Description of the Prior Art

The common way to dispose of industrial wastes containing hazardous heavy metals and cyanides is by mixing them with cement and water and curing the mixture into a solid matrix which protects heavy metals and cyanides from leaching. The waste disposal which was prepared by using cement alone poses the secondary pollution of the environment if it is used indiscriminately. It has turned out that the solid of waste-cement mixture does not meet the requirement for leaching when tested according to California Wet Extraction Test Method. This is true in the case where wastes are lead- and cadmium-containing fly ash collected by an electrostatic precipitator or bag filter of an incinerator and copper- and nickel-containing sludge discharged from a water-treatment unit of a semiconductor factory. The fact that it is difficult to completely seal hazardous industrial wastes in a solid by means of cement alone has aroused a demand for a new material used for disposing of wastes safely without the fear of leaching which causes secondary pollution after land reclamation or ocean dumping.

SUMMARY OF THE INVENTION

The present invention was completed to address the above-mentioned problem involved in the prior art technology. Accordingly, it is an object of the present invention to provide a waste-treating material which is capable of sealing therein industrial wastes containing hazardous heavy metals and cyanides, thereby protecting them from leaching after disposal.

The present invention is embodied in a waste-treating material which comprises cement and at least one reducing metal. The present invention is also embodied in a waste-treating material which comprises cement, at least one reducing metal, and at least one member selected from the group consisting of reducing agent, aluminum sulfate, allophane, and bentonite.

The present invention is also embodied in a method for waste disposal which comprises mixing wastes with cement and at least one reducing metal and optional water, and solidifying the mixture by curing.

According to the present invention, the waste-treating material is composed mainly of cement which is incorporated with at least one reducing metal or a substance comprising a mixture of at least one reducing metal and other element.

The cement as a principal component of the waste-treating material is hydraulic cement or air hardening cement, the former including portland cement (normal cement, super high early strength cement, moderate heat cement, and sulfate resisting cement) and mixed cement (fly ash cement, blast furnace cement, and silica cement), the latter including lime and gypsum. It may be a mixture of lime and cement. There are no specific restrictions on the kind of cement. It should be properly selected according to the nature of industrial wastes and the situation of waste disposal.

The term "reducing metal" as used in the present invention means any metal capable of reducing hazardous metals contained in wastes for disposal. And the term "substance comprising a mixture of at least one reducing metal and other element" means a substance which is a mixture of, for example, iron and silicon, iron and iron oxide, iron and iron chloride, iron and zinc chloride. The examples of such substances are coarse grain dust, slag containing metallic iron, etc. There are no specific restrictions on the form of the reducing metal or the substance containing at least one reducing metal. It should preferably be in the form of powder or grain that can be produced easily by reduction, spraying, electrolysis, pulverizing, quenching, alloying, or the like. It may be an impure by-product of metal refining or working (such as metal-containing slag scattered by slopping, dust collected in a bag house, and dust of shot blasting).

A preferred example of the reducing metal is iron, which is easy to handle and harmless. Sodium and potassium are too reactive and flammable to handle safely. Zinc, chromium, lead, and copper are hazardous heavy metals per se. Although iron is preferable, aluminum and other metals may be used as well if they are in the pollution-free stable form or they are easy to handle.

According to the present invention, the waste-treating material may also contain, in addition to at least one reducing metal or a substance containing at least one reducing metal, at least one member selected from the group consisting of reducing agent, aluminum sulfate, allophane, and bentonite. (They are collectively referred to as the auxiliary hereinafter.) Examples of the reducing agent include sodium thiosulfate, thiourea, ferrous chloride, ferrous sulfate, sodium sulfite, and hydrosulfite, the first two being preferable. The reducing agent keeps the cement-waste mixture in a reductive state until it sets. Aluminum sulfate brings about coagulation through the reaction of sulfate ions with calcium in the cement to form ettringite crystals ($3CaO \cdot Al_2O_3 \cdot CaSO_4 \cdot 32H_2O$), which in turn stabilize heavy metals through the ion-exchange reaction of the divalent cation in the ettringite. Allophane and bentonite promote the formation of ettringite in the cement. Being amorphous, they also produce the effect of physical adsorption. The auxiliary may additionally contain zeolite. As mentioned above, the auxiliary firmly stabilizes heavy metals contained in wastes for disposal.

With the waste-treating material as disclosed herein, it is possible to solve problems involved in the prior art technology by incorporating cement with at least one reducing metal or a substance containing at least one reducing metal. The effect of the waste-treating material will be enhanced by the addition of the auxiliary.

According to the present invention, the waste-treating material may be composed of cement, at least one reducing metal, and an auxiliary in any ratio. Usually, cement accounts for 5–90% (by weight) and an auxiliary accounts for 0–50%, with the remainder being at least one reducing metal. With a low cement content, the waste-treating material will take a long time to set. With a high cement content, the waste-treating material contains a less amount of reducing metal than necessary. With a high auxiliary content, the waste-treating material contains a less amount of reducing metal than necessary. For the waste-treating material to have sufficient strength, it is necessary that the content of cement be 20–80%, preferably 50–70%, and the content of auxiliary be 5–40%, preferably 10–30%. However, it is not necessary to establish a specific mixing ratio for the individual components of the auxiliary.

According to the present invention, the waste-treating material contains a certain amount of reducing metal or a substance containing at least one reducing metal. Their amount should be expressed in terms of percent by weight (as reducing metal) of the waste-treating material, because they may be either a pure metal or an impure substance like iron-containing slag and their purity is not specifically limited. A preferred content of reducing metal is 5–75%. With a low content, the reducing metal produces no more significant effect of protecting hazardous heavy metals from leaching than in the case where cement is used alone. With an excessively high content, the reducing metal will reduce the strength of the waste-treating material after setting to such an extent that it will be broken at the time of disposal (such as reclamation). A preferred amount of the reducing metal should be 10–40% from the standpoint of the strength of the waste-treating material which has set.

According to the present invention, waste disposal may be accomplished by mixing wastes with cement, at least one reducing metal (or a substance containing at least one reducing metal), and an auxiliary all at once. These components may be added individually or in the form of previously prepared mixture. Such a mixture remains as stable as cement in the dry sealed state.

Upon mixing with industrial wastes, the waste-treating material stabilizes hazardous heavy metals (such as mercury, arsenic, copper, lead, nickel, cadmium, and chromium) and cyanides contained in wastes and protects them from leaching.

(The mechanism of stabilization is not yet fully elucidated.) Therefore, it may suitably be used for the disposal of industrial wastes such as sludge and cake resulting from the treatment of waste liquids discharged from semiconductor factories and plating factories. It may also be used for the disposal of hazardous dust collected in steel works and the stabilization of contaminated soil. Waste disposal as mentioned above is highly effective in preventing the leaching of hazardous heavy metals and cyanides.

DESCRIPTION OF THE PREFERRED EMBODIMENTS

To further illustrate the invention, and not by way of limitation, the following examples are given.

EXAMPLE 1

(Disposal of sludge of waste liquid from a plating factory)

Three samples (1-1, 1-2, and 1-3) of the waste-treating material were prepared by thoroughly mixing 100 parts by weight of normal portland cement (from Ube Cement Co., Ltd..) with 100, 66, and 33 parts by weight, respectively, of steel scrap (from Nippon Kokan K.K.). Normal portland cement was used alone as a comparative sample (1-4).

Each sample (300 kg) was mixed with 1 ton of sludge of waste liquid discharged from a plating factory. This sludge contains a large amount of copper, 13.3 g/dry-kg. The mixture was cured for 7 days.

The effect of waste treatment was evaluated by California Wet Extraction Test Method. The results are shown in Table 1, together with the amount of hazardous heavy metals in the sludge, the amount of hazardous heavy metals which are leached when no treatment is made, and the leaching limit in the U.S.

TABLE 1

| | The amount of leached hazardous heavy metals | | | | | | |
|---|---|---|---|---|---|---|---|
| Item | Unit | Cd | *tCr | Cu | Ni | Pb | Zn |
| Heavy metals in sludge | mg/dry. kg | 4.51 | 47.6 | 13300 | 58.1 | 33.6 | 2.03 |
| Leached from untreated waste | mg/l | 0.12 | 1.47 | 1020 | 1.40 | 1.51 | 2.55 |
| Sample 1-1 | mg/l | 0.08 | 0.73 | 8.3 | 0.77 | 0.93 | 0.12 |
| Sample 1-2 | mg/l | 0.08 | 0.78 | 12.5 | 0.82 | 0.80 | 0.09 |
| Sample 1-3 | mg/l | 0.08 | 0.78 | 20.2 | 0.72 | 0.78 | 0.10 |
| Sample 1-4 | mg/l | 0.09 | 1.41 | 270.0 | 1.26 | 3.11 | 0.40 |
| Leaching limit | mg/l | <1.0 | <560 | <25 | <20 | <5.0 | <250 |

*tCr = total Cr
Evaluated by the California wet extraction test method (U.S.A.)

It is noted from Table 1 that the waste-treating material of the present invention insolubilizes all the hazardous heavy metals, especially copper, much more effectively than portland cement used alone (sample 1-4). It is also noted that the more the amount of steel scrap in the waste-treating material, the less the amount-of copper leached from the treated waste.

EXAMPLE 2

(Disposal of fly ash collected by an electrostatic precipitator of a waste incinerator)

Four samples (2-1, 2-2, 2-3, and 2-4) of the waste-treating material were prepared by thoroughly mixing 100 parts by weight of normal portland cement (from Ube Cement Co., Ltd.) with 200, 100, 66, and 33 parts by weight, respectively, of steel scrap (from Nippon Kokan K.K.). Normal portland cement was used alone as a comparative sample (2-5).

Each sample (200 kg) was mixed with 1 ton of fly ash collected by an electrostatic precipitator from the combustion gas of a waste incinerator. The mixture was further mixed with 50 kg of water, followed by curing for 7 days. For comparison, 200 kg of normal portland cement was mixed with 1 ton of fly ash, and the mixture was further mixed with 50 kg of water, followed by curing for 7 days.

The effect of waste treatment was evaluated by the leaching test method (conforming to Notification No. 13 of the Environment Agency of Japan). The results are shown in Table 2, together with the amount of hazardous heavy metals in the fly ash, the amount of hazardous heavy metals which are leached when no treatment is made, and the relevant leaching limit.

TABLE 2

The amount of leached hazardous heavy metals

| Item | Unit | Cd | *tCr | Cu | Pb |
|---|---|---|---|---|---|
| Heavy metals in fly ash | mg/dry-kg | 145 | 103 | 621 | 2710 |
| Leached from untreated waste | mg/l | 0.03 | 53.5 | 10.7 | 27.5 |
| Sample 2-1 | mg/l | 0.01 | 0.30 | 0.06 | 0.11 |
| Sample 2-2 | mg/l | 0.01 | 0.40 | 0.10 | 0.22 |
| Sample 2-3 | mg/l | <0.01 | 0.69 | 0.35 | 0.16 |
| Sample 2-4 | mg/l | 0.01 | 0.89 | 1.82 | 0.19 |
| Sample 2-5 | mg/l | 0.03 | 1.79 | 19.4 | 0.34 |
| Leaching limit | mg/l | <1.0 | <0.5 | <3 | <1 |

*tCr = total Cr
Evaluated by the leaching test method (conforming to Notification No. 13 of the Environment Agency of Japan It is noted from Table 2 that the waste-treating material of the present invention insolubilizes all the hazardous heavy metals, especially total chromium and copper, much more effectively than portland cement used alone (sample 2-5). It is also noted that the more the amount of copper leached in the case of treatment with normal portland cement alone is larger than that of untreated fly ash. This is not the case in the waste-treating material of the present invention.

EXAMPLE 3

(Disposal of sludge discharged from a semiconductor factory)

Five samples (3-1, 3-2, 3-3, 3-4, and 3-5) of the waste-treating material were prepared by thoroughly mixing 100 parts by weight of normal portland cement (from Ube Cement Co., Ltd.) with atomized iron powder (300M from Kobe Steel Ltd.), reagent-grade iron powder (from Wako Pure Chemical Industries, Ltd.), or steel dust (from Kobe Steel Ltd.) in an amount of 50, 150, or 200 parts by weight as shown in Table 3. The content of iron was determined by the potassium permanganate method.

TABLE 3

Composition of waste-treating material

| Sample designation | Weight of cement (parts by weight) | Composition of iron-containing substance | | |
|---|---|---|---|---|
| | | Designation | Weight (pbw) | Fe (%) |
| Sample 3-1 | 100 | Atomized iron powder | 150 | 97.8 |
| Sample 3-2 | 100 | Reagent-grade iron powder | 150 | 88.2 |
| Sample 3-3 | 100 | Steel dust | 150 | 8.4 |
| Sample 3-4 | 100 | Steel dust | 200 | 64.5 |
| Sample 3-5 | 100 | Steel dust | 50 | 70.5 |

Each sample (350 kg) was mixed with 1 ton of sludge discharged from a semiconductor factory. The mixture was cured for 7 days. The effect of waste treatment was evaluated by California Wet Extraction Test Method. The results are shown in Table 4, together with the leaching limit in the U.S.

TABLE 4

The amount of leached Cu

| Item | Unit | Cu |
|---|---|---|
| Sample 3-1 | mg/l | 9.0 |
| Sample 3-2 | mg/l | 7.4 |
| Sample 3-3 | mg/l | 44.0 |
| Sample 3-4 | mg/l | 12.5 |
| Sample 3-5 | mg/l | 22.0 |
| Leaching limit | mg/l | <25 |

Evaluated by the California wet extraction test method (U.S.A.)

It is noted from Table 4 that the waste-treating material of the present invention insolubilizes copper effectively and that the effectiveness is proportional to the amount of iron added to the waste-treating material.

EXAMPLE 4

(Disposal of slag discharged from an electric furnace)

Five samples (4-1, 4-2, 4-3, 4-4, and 4-5) of the waste-treating material were prepared by thoroughly mixing 100 parts by weight of normal portland cement(from Ube Cement Co., Ltd.) with 40 parts by weight of steel scrap (from Kobe Steel Ltd.) and all or any one of sodium thio-sulfate (from Nakaraitesk) as a reducing agent, aluminum sulfate (from Nakaraitesk), allophane, and bentonite in amounts as shown in Table 5. A comparative sample (4-6) was prepared from 100 parts by weight of normal portland cement and 40 parts by weight of steel scrap.

TABLE 5

Composition of waste-treating material
Unit: parts by weight

| Sample designation | Cement | Steel scrap | Auxiliary components | | | |
|---|---|---|---|---|---|---|
| | | | Reducing agent | Aluminum sulfate | Allophane | Bentonite |
| Sample 4-1 | 100 | 40 | 10 | 5 | 2 | 2 |
| Sample 4-2 | 100 | 40 | 10 | 0 | 0 | 0 |
| Sample 4-3 | 100 | 40 | 0 | 5 | 0 | 0 |
| Sample 4-4 | 100 | 40 | 0 | 0 | 2 | 0 |
| Sample 4-5 | 100 | 40 | 0 | 0 | 0 | 2 |
| Sample 4-6 | 100 | 40 | 0 | 0 | 0 | 0 |

Each sample (250 kg) was mixed with 1 ton of slag discharged from an electric furnace. The mixture was further mixed with 80 kg of water, followed by curing for 7 days. For comparison, 250 kg of normal portland cement was mixed with 1 ton of slag, and the mixture was further mixed with 80 kg of water, followed by curing for 7 days.

The effect of waste treatment was evaluated by California Wet Extraction Test Method. The results are shown in Table 6, together with the amount of hazardous heavy metals in the slag and the leaching limit in the U.S.

TABLE 6

| | The amount of leached hazardous heavy metals | | | |
|---|---|---|---|---|
| Item | Unit | *tCr | Cu | Pb |
| Heavy metals in slag | mg/dry-kg | 162.3 | 3.55 | 51.4 |
| Sample 4-1 | mg/l | 12.1 | 0.64 | 2.05 |
| Sample 4-2 | mg/l | 10.8 | 0.82 | 2.82 |
| Sample 4-3 | mg/l | 11.3 | 0.55 | 2.33 |
| Sample 4-4 | mg/l | 15.4 | 0.72 | 4.80 |
| Sample 4-5 | mg/l | 13.8 | 0.70 | 5.21 |
| Sample 4-6 | mg/l | 16.7 | 0.90 | 5.44 |
| Leaching limit | mg/l | <560 | <25 | <5.0 |

*tCr = total chromium
Evaluated by the California wet extraction test method (U.S.A.)

It is noted from Table 6 that the waste-treating material becomes more effective when incorporated with the auxiliary components (reducing agent, aluminum sulfate, allophane, and bentonite) in addition to the reducing metal.

EXAMPLE 5

(Comparison of various reducing agent)

Four samples (5-1, 5-2, 5-3, and 5-4) of the waste-treating material were prepared by throughly mixing 100 parts by weight of normal portland cement (from Ube Cement Co., Ltd.) with 40 parts by weight of steel scrap (from Kobe Steel Ltd.) and 10 parts by weight each of various reducing agents (sodium thiosulfate, thiourea, ferrous chloride, and ferrous sulfate, from Nakaraitesk) as shown in Table 7. A comparative sample (5—5) was prepared from 100 parts by weight of normal portland cement and 40 parts by weight of steel scrap. Normal portland cement alone was used as a conventional sample (5-6).

TABLE 7

Composition of waste-treating material
Unit: parts by weight

| Designation | Amount of cement | Amount of steel scrap | Name of reducing agent | Amount of reducing agent |
|---|---|---|---|---|
| Sample 5-1 | 100 | 40 | Sodium thiosulfate | 10 |
| Sample 5-2 | 100 | 40 | Thiourea | 10 |
| Sample 5-3 | 100 | 40 | Ferrous chloride | 10 |
| Sample 5-4 | 100 | 40 | Ferrous sulfate | 10 |
| Sample 5-5 | 100 | 40 | — | — |
| Sample 5-6 | 100 | 0 | — | — |

Each sample (250 kg) was mixed with 1 ton of slag dust discharged from an electric furnace, and the mixture was further mixed with 80 kg of water, followed by curing for 7 days. For comparison, 250 kg of normal portland cement was mixed with 1 ton of slag dust and the mixture was further mixed with 80 kg of water, followed by curing for 7 days. The effect of waste-treatment was evaluated by California Wet Extraction Test Method. The results are shown in Table 8, together with the amount of hazardous heavy metals which are leached when no treatment is made, and the leaching limit in the U.S.

TABLE 8

| | The amount of leached hazardous heavy metals | | |
|---|---|---|---|
| Item | Unit | Cd | Cu |
| Leached from untreated waste | mg/dry-kg | 1.09 | 3.55 |
| Sample 5-1 | mg/l | 0.08 | 0.82 |
| Sample 5-2 | mg/l | 0.02 | 0.52 |
| Sample 5-3 | mg/l | 0.09 | 0.89 |
| Sample 5-4 | mg/l | 0.09 | 1.01 |
| Sample 5-5 | mg/l | 0.09 | 1.11 |
| Sample 5-6 | mg/l | 0.09 | 7.82 |
| Leaching limit | mg/l | <1.0 | <25 |

Evaluated by the California wet extraction test method (U.S.A.)

It is noted from Table 8 that the waste-treating material of the present invention insolubilizes all the hazardous heavy metals more effectively than portland cement incorporated with steel scrap alone (sample 5—5). It is also noted that the effect is enhanced by the addition of sodium thiocyanate or thiourea as a reducing agent.

EXAMPLE 6

(Disposal of slag discharged from an electric furnace)

A sample (6-2) of the waste-treating material was prepared by thoroughly mixing 60 parts by weight of normal portland cement (from Ube Cement Co., Ltd.) with 20 parts by weight of steel scrap (from Kobe Steel Ltd.) and sodium thiosulfate (10 parts by weight) as a reducing agent, aluminum sulfate (5 parts by weight), allophane (3 parts by weight), and bentonite (2 parts by weight). Normal portland cement (100 parts by weight) was used alone as a comparative sample (6-1).

The sample 6-2 (300 kg) was mixed with 1 ton of slag discharged from an electric furnace. The mixture was further mixed with 80 kg of water, followed by curing for 7 days. For comparison, 300 kg of normal portland cement was mixed with I ton of the slag, and the mixture was further mixed with 80 kg of water, followed by curing for 7 days. The effect of waste treatment was evaluated by the leaching test method (conforming to Notification No. 13 of the Environment Agency of Japan). The results are shown in Table 9, together with the amount of hazardous heavy metals which are leached when no treatment is made, and the relevant leaching limit.

TABLE 9

| | | The amount of leached hazardous heavy metals | | |
|---|---|---|---|---|
| Heavy metal | Unit | Leaching limit | Un-treated | Sample 6-1 | Sample 6-2 |
| Cu | mg/l | <3 | 18.7 | 0.12 | <0.05 |
| Pb | mg/l | <1 | 6.12 | 0.63 | 0.27 |
| Zn | mg/l | <5 | 0.28 | 0.09 | <0.01 |
| Hg | mg/l | <0.005 | 479 | 310 | 0.52 |
| CN | mg/l | <1 | 101 | 54.0 | 0.50 |
| $Cr^{6+}$ | mg/l | <0.5 | 6.00 | 5.04 | <0.03 |

Evaluated by the leaching test method (conforming to Notification No. 13 of the Environment Agency of Japan)

It is noted from Table 9 that the waste-treating material of the present invention insolubilizes all the hazardous heavy metals and cyanides much more effectively than portland cement used alone.

EXAMPLE 7

(Disposal of sludge containing arsenic)

A sample (7-2) of the waste-treating material was prepared by thoroughly mixing 10 parts by weight of anhydrous gypsum with 50 parts by weight of steel scrap (from Kobe Steel Ltd. ) and sodium thiosulfate (10 parts by weight) as a reducing agent, aluminum sulfate (5 parts by weight), allophane (10 parts by weight), and bentonite (15 parts by weight). Normal portland cement (100 parts by weight) was used alone as a comparative sample (7-1).

One ton of the sample (7-2) was mixed with 1 ton of sludge (containing arsenic in the sulfide form originating from iron ore during steel making). The mixture was cured for 7 days. For comparison, 1 ton of normal portland cement was mixed with 1 ton of the sludge, followed by curing for 7 days. The effect of waste treatment was evaluated by the leaching test method (conforming to Notification No. 13 of the Environment Agency of Japan). The results are shown in Table 10, together with the amount of hazardous heavy metals in the sludge, the amount of hazardous heavy metals which are leached when no treatment is made, and the relevant leaching limit.

TABLE 10

| | The amount of leached hazardous heavy metals | | | | |
|---|---|---|---|---|---|
| Item | Content in sludge | Un-treated | Sample 7-1 | Sample 7-2 | Leaching limit |
| Unit | mg/dry-kg | mg/l | mg/l | mg/l | mg/l |
| As | 36900 | 851 | 2560 | 0.3 | <0.5 |
| Cd | 215 | 2.09 | 0.03 | 0.02 | <0.1 |
| *tCr | 7.79 | 0.06 | 0.04 | 0.01 | — |
| Cu | 52600 | 0.08 | 394 | 0.04 | <3.0 |
| Pb | 2520 | 0.77 | 0.31 | 0.06 | <1.0 |
| Zn | 252 | 4.87 | 2.46 | 0.02 | <5.0 |

*tCr = total chromium
Evaluated by the leaching test method (conforming to Notification No. 13 of the Environment Agency of Japan)

It is noted from Table 10 that the waste-treating material of the present invention insolubilizes all the hazardous heavy metals, particularly arsenic and copper, much more effectively than portland cement used alone.

What is claimed is:

1. A material for treatment of waste containing at least one hazardous material selected from the group consisting of mercury, arsenic, copper, lead, nickel, cadmium, chromium, and cyanide, which comprises cement and at least one reducing metal in a form of powder or grain and capable of reducing metals of said hazardous material, the reducing metal being from 5 to 75 wt. % of the material for treatment of waste.

2. A waste-treating material as defined in claim 1, wherein said reducing metal is contained in the material as a substance comprising a mixture of at least one reducing metal and other element.

3. A waste-treating material as defined in claim 1 or 2, wherein said at least one hazardous material is selected from the group consisting of mercury, arsenic, copper, lead, nickel, and cadmium and said reducing metal is of an iron.

4. A material according to claim 3, wherein the reducing metal includes steel.

5. A waste-treating material as defined in claim 1, which further comprises at least one member selected from a group consisting of sodium thiosulfate, thiourea, ferrous chloride, ferrous sulfate, sodium sulfite, hydrosulfite, aluminum sulfate, allophane, and bentonite.

6. A method for treatment of waste containing at least one hazardous material selected from the group consisting of mercury, arsenic, copper, lead, nickel, cadmium, chromium, and cyanide, which comprises mixing the waste with a waste treating material including cement and at least one reducing metal in a form of powder or grain capable of reducing metals of the hazardous material, and solidifying the mixture by curing.

7. A method for waste treatment as defined in claim 6, which comprises mixing the wastes with cement, at least one reducing metal and water, and solidifying the mixture by curing.

8. A method according to claim 6, wherein said at least one hazardous material is selected from the group consisting of mercury, arsenic, copper, lead, nickel, and cadmium and the reducing metal includes iron.

9. A method according to claim 8, wherein the reducing metal includes steel.

* * * * *